(12) United States Patent
Alport et al.

(10) Patent No.: US 9,199,800 B2
(45) Date of Patent: Dec. 1, 2015

(54) MONITORING OF CONVEYOR BELTS

(75) Inventors: Michael John Alport, Durban (ZA);
Jacques Frederick Basson, Durban (ZA); Thavashen Padayachee, Durban (ZA)

(73) Assignee: ADVANCED IMAGING TECHNOLOGIES (PROPRIETARY) LIMITED, Durban (ZA)

( * ) Notice: Subject to any disclaimer, the term of this patent is extended or adjusted under 35 U.S.C. 154(b) by 485 days.

(21) Appl. No.: 12/449,147

(22) PCT Filed: Jan. 24, 2008

(86) PCT No.: PCT/IB2008/050255
§ 371 (c)(1),
(2), (4) Date: Feb. 26, 2010

(87) PCT Pub. No.: WO2008/090523
PCT Pub. Date: Jul. 31, 2008

(65) Prior Publication Data
US 2010/0145631 A1     Jun. 10, 2010

(30) Foreign Application Priority Data

Jan. 26, 2007   (ZA) ................................. 2007/00760

(51) Int. Cl.
*G01R 33/12*     (2006.01)
*G06F 19/00*     (2011.01)
(Continued)

(52) U.S. Cl.
CPC ..................................... *B65G 43/02* (2013.01)

(58) Field of Classification Search
CPC ....................................................... B65G 43/02
USPC ............. 702/1, 33, 34, 35, 38, 113, 142, 150; 324/200, 216, 227, 238; 198/810.02
See application file for complete search history.

(56) References Cited

U.S. PATENT DOCUMENTS 3,899,071 A * 8/1975 Duffy ....................... 198/810.02
4,439,731 A * 3/1984 Harrison ........................ 324/239
(Continued)

FOREIGN PATENT DOCUMENTS

JP           06003137 A  *  1/1994

OTHER PUBLICATIONS

F.W. Sears et al., College Physics Electricity and Magnetism, Light, and Atomic Physics, 1960, Addison-Wesley, 3rd edition, pp. 657-662.*

(Continued)

*Primary Examiner* — Janet Suglo
*Assistant Examiner* — Yaritza H Perez Bermudez
(74) *Attorney, Agent, or Firm* — Drinker Biddle & Reath LLP

(57) ABSTRACT

A system for monitoring a conveyor belt having magnetically permeable cords, has an AC magnetic field generator for generating an alternating magnetic field to magnetize the cords, in use; a magnetic field sensing unit for sensing the alternating magnetic field provided, in use, by the cords and for providing signals representative of the alternating magnetic field; arid a processor for processing the signals to monitor continuous parts of the cords. The system further has a DC magnetic field generator for erasing an AC field previously generated by the AC magnetic field generator, the AC magnetic field generator being positioned between the DC magnetic field generator and the magnetic field sensing unit. The processor also determines the speed of travel of the belt, and the position in space of a lateral edge of the belt.

21 Claims, 2 Drawing Sheets

(51) Int. Cl.
*G01P 3/00* (2006.01)
*B65G 43/02* (2006.01)

(56) References Cited

U.S. PATENT DOCUMENTS

| | | | | |
|---|---|---|---|---|
| 4,864,233 | A | * | 9/1989 | Harrison ........................ 324/227 |
| 5,426,362 | A | * | 6/1995 | Ninnis ........................... 324/235 |
| 5,847,563 | A | * | 12/1998 | Blum ............................. 324/232 |
| 2008/0308391 | A1 | * | 12/2008 | May ........................... 198/810.02 |

OTHER PUBLICATIONS

Hyperphysics.phy-astr.edu, Faraday's Law, http://hyperphysics.phy-astr.gsu.edu/hbase/electric/farlaw.html, Dec. 5, 2006.*
Lawrence B. Rees, Lesson 11—Faraday's Law of Induction, 2006, pp. 1-21.*
The Free Dictionary by Farlex, Magnetic Permeability, pp. 1 http://www.thefreedictionary.com/Permeability+%28electromagnetism%29.*

* cited by examiner

MONITORING OF CONVEYOR BELTS

TECHNICAL FIELD

This invention relates to monitoring of conveyor belts. More particularly it relates to a system for and a method of monitoring conveyor belts having magnetically permeable cords. It extends to a conveyor belt arrangement which has the system.

BACKGROUND

It is well known that the complete failure of steel cord-reinforced conveyor belts as used on conveyor belt structures in various mining and industrial applications can have catastrophic results. As such, condition monitoring of these conveyor belts has become common practice, the objective being to identify damage to conveyor belts and thus to effectively maintain conveyor belts.

A typical steel cord-reinforced conveyor belt as herein envisaged is made up of elongated conveyor belt sections, typically in the order of 300 m in length.

Each section comprises a central layer of multi-stranded steel cords sandwiched in a substantially equally-spaced, parallel configuration between two rubber layers, the sections being connected by means of splices. A splice between two sections is formed by overlapping the ends of the two sections by one to five meters and vulcanizing the sections together. When the sections are so connected, the cords of the sections in the overlapping region are arranged in a pattern in which alternating cords of the sections lie in a parallel adjacent relationship.

It is known to monitor conveyor belts for cord breaks by magnetizing the cords using a permanent magnet array and then detecting fringing magnetic fields resulting from breaks. The condition of splices may also be monitored in this manner.

However, this technique has a serious deficiency. There is only a detectable magnetic field just above the cord break or just above the cord end. Thus the magnetic image above intact cords is blank—i.e. they are magnetically invisible.

If for example for a new belt, here are many unbroken long cords, then after magnetizing, the magnetic image will be blank except for a single dip at one end (the south pole) of these cords and a peak at the other end (north pole). There is in fact a very small dipole magnetic field that exists between these very separated poles. However, since the cords of a new belt segments are typically 2-30 Om apart, the resulting magnetic field is very small and difficult to detect.

With a new belt it is desirable to know the number of cords thereof and their spacing, which is not possible to do with such existing technology. Also, in some applications cords are placed across the belt at 45° in order to detect rips, since if a longitudinal rip occurs, this will cut these diagonal cords and produce additional north/south pole pairs where none were previously present. However again, intact transverse cords are invisible with present magnetic field detection technology. It is again desirable to be able to detect the presence of the diagonal cords and hence confirm that the rip detection functionality was intact.

It is thus an object of this invention to provide a method of and an apparatus for the above purpose and in respect of which the above inadequacies are at least ameliorated.

SUMMARY

According to the invention there is provided a system for monitoring a conveyor belt having magnetically permeable cords, which includes an AC magnetic field generator for generating an alternating magnetic field to magnetize the cords, in use;
a magnetic field sensing unit for sensing the alternating magnetic fields provided, in use, by the cords and for providing signals representative of the alternating magnetic fields; and
a processor for processing the signals to monitor continuous parts of the cords Further according to the invention there is provided a method of monitoring a conveyor belt having magnetically permeable cords, which includes
generating an alternating magnetic field to magnetize the cords in an alternating manner;
sensing the magnetic fields provided by the cords and providing signals representative of their magnetic fields; and
processing the signals to monitor continuous parts of the cord.

Still further according to the invention, there is provided a conveyor belt arrangement, which includes
a belt having a plurality of magnetically permeable cords; and
a system for monitoring the belt as described above, the AC magnetic field generator and the magnetic field sensing unit thereof being positioned adjacent the belt and longitudinally spaced from one another.

The sensing unit may comprise an array of spaced magnetic field sensors, the signals from the sensors being processed. The sensors may have a sensing axis, such that the magnetic field strength in that direction is sensed. The magnetic field sensing unit may then have sensors suitably oriented to sense two, or all three, of the components of the magnetic field at spaced positions across the belt. The spacing thereof may be sufficiently small to provide the desired resolution.

The system may have a DC magnetic field generator for supplying a DC magnetic field to erase the alternating field previously supplied by the AC magnetic field generator. Thus, the AC magnetic field generator may be positioned between the DC magnetic field generator and the field sensing unit. The presence, spacing and position of intact cords may be determined by means of the invention. The degree of overlap in splices may also be determined. In addition the transverse position of an edge of the belt may be monitored and the speed of travel of the belt may be measured. To enable the system to monitor the position of the edge of the belt, the sensing unit may be wider than the belt and may extend beyond the ends thereof.

The processor may generate images representing the continuous parts of cords of the belt and the system may include a display for displaying the images.

The system may include data acquisition equipment for processing signals received from the sensors and for supplying data to the processor. The data acquisition equipment may have multiple channels or may be of the multiplexed type. If multiplexing is utilised then either analogue or digital multiplexing may be utilized.

It will be appreciated by those skilled in the art that the system may also include a belt speed determining means for determining the speed of travel of the belt in a longitudinal direction, and hence the longitudinal position of the belt at each sampling point. The belt speed determining means may include an encoder connected to a pulley of the conveyor belt arrangement.

BRIEF DESCRIPTION OF THE DRAWINGS

The invention will now be described by way of non-limiting examples, with reference to the accompanying schematic drawings, in which.

DETAILED DESCRIPTION OF PREFERRED EMBODIMENTS

Figure 1:
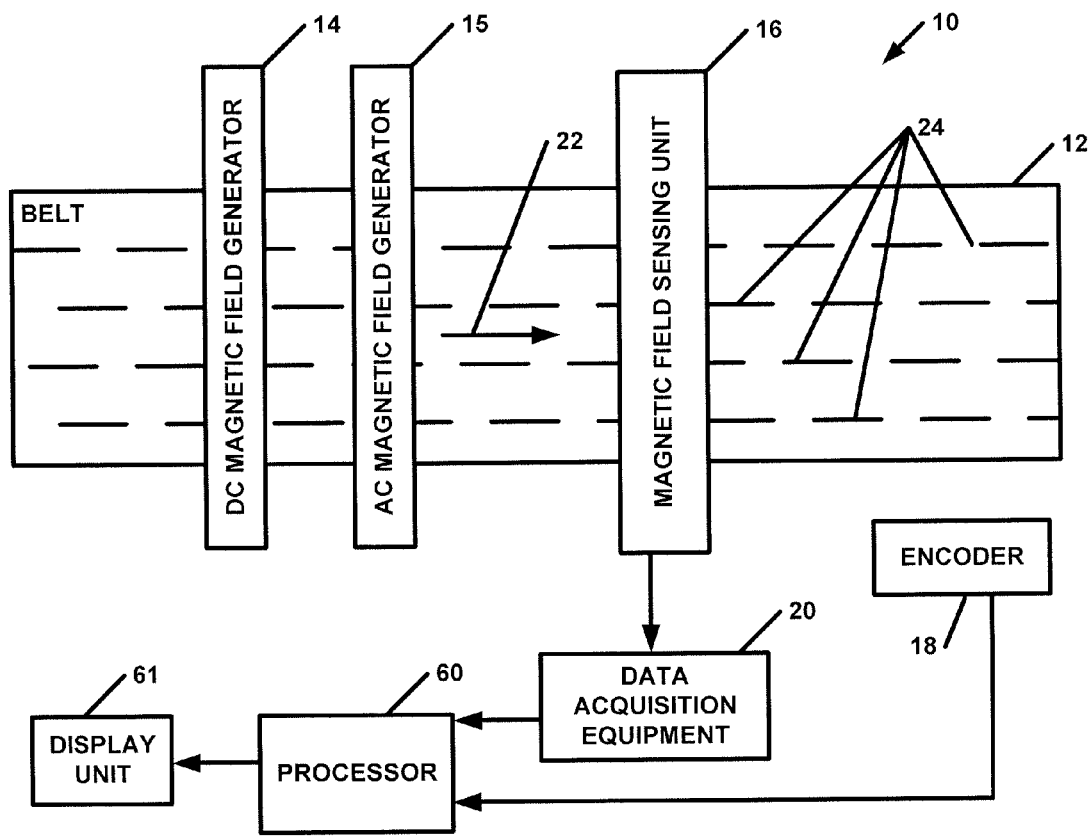
FIG. 1 shows schematically a conveyor belt arrangement in accordance with the invention.

Referring to FIG. 1, a conveyor belt arrangement in accordance with the invention is designated generally by reference numeral 10. The conveyor belt arrangement 10 has a conveyor belt 12, a DC magnetic field generator 14, an AC magnetic field generator 15, a magnetic field sensing unit 16, an encoder 18 for determining the speed of travel of the conveyor belt 12 and data acquisition equipment 20 for processing signals received from the magnetic field sensing unit 16 and for supplying data to a processor 60. The processor 60 supplies images to a display unit 61 to be displayed thereby. The direction of travel of the conveyor belt 12 is indicated by arrow 22. The DC magnetic field generator 14 and the magnetic field sensing unit 16 extend across the conveyor belt 12 and are mounted about 4 cm to 5 cm above the conveyor belt 12. The encoder 18 is connected to a pulley of the conveyor belt arrangement 10, to monitor the speed of travel of the conveyor belt 12. The DC magnetic field generator 14, the AC magnetic field generator 15 and the magnetic field sensing unit 16 all extend beyond the sides of the conveyor belt 12 about 50 cms which length exceeds the distance by which the belt tracks sideways (in the transverse direction) during a full belt revolution. The AC magnetic field generator 15 is excited at a frequency of between 4 Hz and 50 Hz.

It will be appreciated that the direction of travel 22 defines a longitudinal direction, with a transverse direction being defined across the conveyor belt 12 and a perpendicular direction being defined perpendicular to the conveyor belt 12.

The conveyor belt 12 transports bulk material such as coal, iron ore and the like. It is constructed of a rubber matrix in which is imbedded a number of cords 24 that are comprised of braided strands of steel wire that run along the length of the conveyor belt 12.

These cores are thus magnetically permeable. Typical belts have cord spacing of 10 mm to 25 mm. Clearly, the number of cords 24 in the conveyor belt 12 will depend on the spacing of the cords 24 and the width of the conveyor belt 12. Although only four cords 24 are shown in FIG. 1 it will be appreciated that in practice a larger number of cords 24 will typically be used.

The AC magnetic field generator 15 is an array of electromagnets or solenoids, that is placed across the belt as shown in FIG. 1. The axis of each electromagnet or solenoid is oriented perpendicular or parallel to the conveyor belt 12. The DC magnetic field generator 14 is placed upstream of the AC magnetic field generator 15. The DC magnetic field generator 14 is still required to erase the previous cycle's AC field. The magnetic field sensing unit 16 is placed downstream of the AC magnetic field generator 15.

In use, as is known in the art, an alternating magnetic field is generated by the DC magnetic field generator 14 which magnetises the cords 24 with an alternating magnetic field, along their entire lengths. These magnetic fields are sensed by sensors of the magnetic field sensing unit 16. Signals provided by the magnetic field sensing unit 16 are processed by the data acquisition equipment 20 which provides data to the processor 60. The processor processes the data, as is explained further below.

Figure 2:
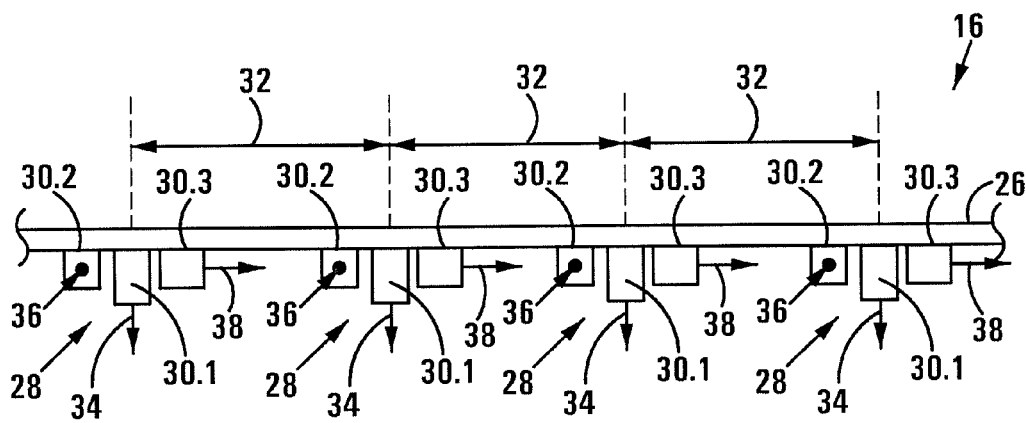
FIG. 2 shows schematically an array of sensors which is part of the system of FIG. 1.

Referring now to FIG. 2, an embodiment of the magnetic field sensing unit 16 is shown. This magnetic field sensing unit 16 has an elongated carrier 26 on which are mounted a number of groups 28 of sensors 30.1, 30.2 and 30.3. The sensors 30.1, 30.2 and 30.3 each have a sensing axis. Each group 28 has a perpendicular sensor 30.1, a longitudinal sensor 30.2 and a transverse sensor 30.3. The perpendicular sensor 30.1 of each group has its associated longitudinal sensor 30.2 on its left side and its associated transverse sensor 30.3 on its right side. The groups 28 are spaced apart a distance indicated by arrows 32. The perpendicular sensors 30.1 have a sensing axis 34, the longitudinal sensors 30.2 have a sensing axis 36, and the transverse sensors 30.3 have a sensing axis 38. It will thus be appreciated that when the carrier is placed in position across and above the conveyor belt 12, the perpendicular sensors 30.1 will point down, the longitudinal sensors 30.2 will point in the direction of travel 22 and the transverse sensors 30.2 will point across the conveyor belt 12. Thus, the perpendicular sensors 30.1 will measure the vertical component of the magnetic field, the longitudinal sensors 30.2 will measure the longitudinal component of the magnetic field and the transverse sensors 30.3 will measure the transverse component of the magnetic field at each position across the conveyor belt 12 as the belt travels below it. As indicated above the signals from the longitudinal sensors 30.2 and the transverse sensors 30.3 are interpolated to provide representative signals at the centre of their associated perpendicular sensors 30.1. The carrier 26 and the sensors 30.1, 30.2 and 30.3 provides a single array 40.

The groups 28 are spaced about 10 mm apart.

The sensors 30.1, 30.2 and 30.3 are Hall effect sensors and are supplied by Allegro Microsystems, with part number A1302KLHLt-T.

It will be appreciated that in many applications it will be sufficient to determine only the perpendicular magnetic component and the conveyor belt arrangement 10 could use only perpendicular sensors 30.1, in which event they may be spaced about 4 mm.

Figure 3:
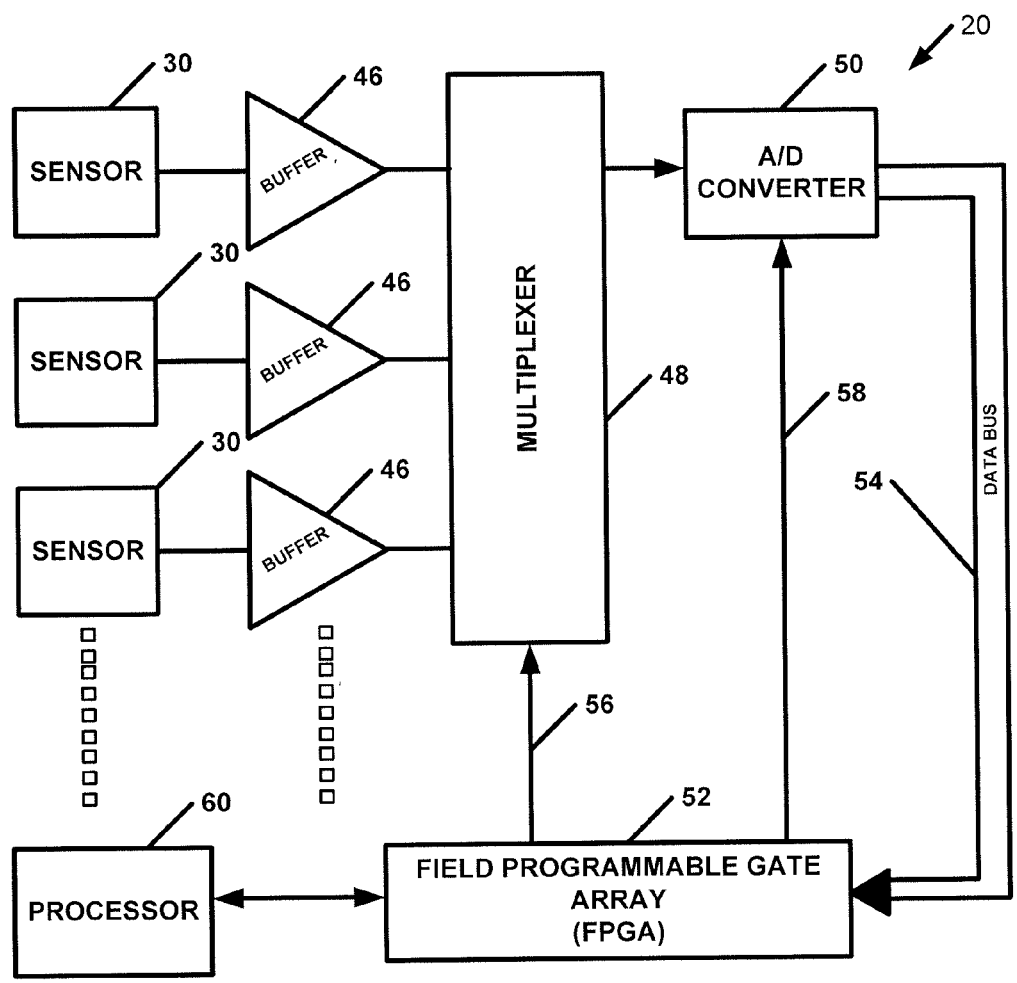
FIG. 3 shows schematically an embodiment of data acquisition equipment which is part of the system of FIG. 1.

Referring now to FIG. 3 an embodiment of data acquisition equipment 20 for processing the signals received from sensors 30 is shown. The equipment 20 has a buffer 46 for each sensor 30 which supplies an analog multiplexer 48 with buffered signals. The output of the multiplexer 48 is supplied to an A/D converter 50, the digital output of which is supplied to a field programmable gate array (FPGA) 52 via a data bus 54. The FPGA 52 is connected to the multiplexer 48 and the converter 50 by command links 56 and 58. The FPGA 52, in turn, supplies data signals to a processor 60.

The analog voltages from each of the sensors 30.1, 30.2 and 30.3 are first amplified and filtered by the buffers 46. The filtered analog values are fed into the n-channel multiplexer 48. n is the number of sensors 30.1, 30.2 and 30.3. The command outputs from the FPGA 52 determines which analog input value is switched through to the output of the multiplexer 48. Typically devices with only a maximum of 16 channel multiplexers are available. However, the number of channel inputs can be increased by connecting a number of slave multiplexers to one master multiplexer. For example, the outputs of sixteen 16-channel slave multiplexers can be connected to the inputs of a single master multiplexer. This particular configuration will result in the equivalent of a single 16×16=256 channel multiplexer. The analog voltage outputs from, typically 256, channels are converted to their digital values by the single A/D converter 50. The A/D converter 50 must be capable of sampling at a rate equal to $n.f_{samp}$ where n is the number of analog channels and $f_{samp}$ is the sampling frequency of each channel. The FPGA 52 directs the required convert signal to the A/D converter 50, and controls the A/D converter thus determining the sampling rate. The digital outputs from the A/D converter 50 are received by the FPGA 52 and sent to the processor 60 via a suitable (e.g. ISA) bus.

Figure 4:
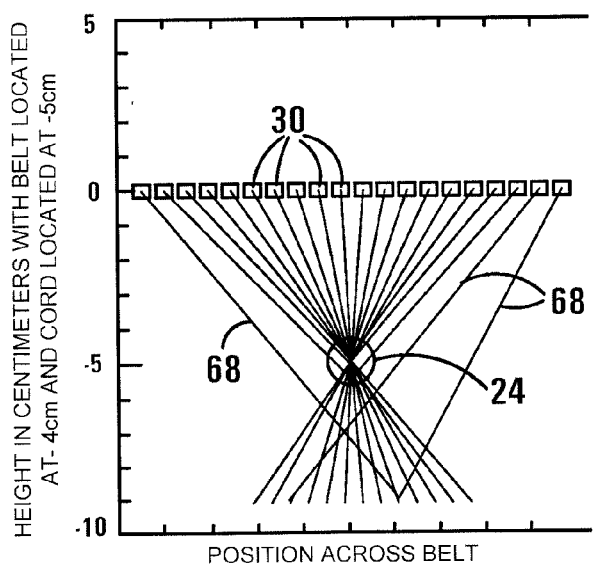
FIG. 4 shows schematically how the vertical position of a cord in the matrix of the conveyor belt is determined graphically

With reference to FIG. 4, there is a graphical indication of the manner in which the position of a cord in the belt matrix may be determined. Using only the perpendicular components of the magnetic field from the sensors is adequate to identify the transverse and longitudinal position of a cord, but this does not give its vertical position in the belt matrix. In order to do this at least one other magnetic field component needs to be measured. For example if the transverse and perpendicular components are plotted in a plane perpendicular to the cords, then the vectors, when extrapolated in both directions in the region of the poles, will be directed to the cords, and in fact will intersect the center of the cords. An example of this result is shown in FIG. 4 where the vector magnetic field, measured by each sensor at z=0, when extrapolated, meet at the center of the cords located at z=−5. This technique works since there is a one to one correspondence between the magnetized cords and the resulting fields. Care should be taken to only extrapolate those vectors that have a significant perpendicular component. For example, those lines which originate between the cords and marked 68 do not intersect at the cords.

The processor 60 determines from the data supplied to it, the transverse position of each cord 24, at each longitudinal sample point, and plots these to provide an image of the cords 24 of the conveyor belt 12 showing where they are positioned relative to the sides of the conveyor belt 12. This image is then displayed on the display unit 61. Similarly, vertical position of each cord 24 in the belt matrix is determined along the length of the cord 24, an image generated, and then displayed on the display unit 61.

Since the steel cords 24 in the conveyor belt 12 are oriented parallel to the direction of movement, a common damage mode is when a stake or piece of metal pierces the cord and then rips the rubber along its length between two cords 24. It is known to place one or more cords in a patch that is vulcanised to the top of the conveyor belt 12 with the additional (thinner) cord strands oriented at ~45 degrees to the conveyor belt 12 to provide a rip detector. With the invention, the rip detector cords are magnetized and the AC modulation is able to confirm that the lines of diagonal rip cords are present and intact.

It will be appreciated that it is possible, with the invention, to identify the edge cords 24 of the conveyor belt 12 and their spatial positions. It is thus also possible, with the invention to determine the spatial positions of the edges of the conveyor belt 12. An edge tracking plot of the conveyor belt 12 for one revolution is a useful technique in confirming the correct alignment of the splices and pulleys. If the pulleys and splices are not correctly aligned, then there will be excessive sideways (in the transverse direction) motion of the belt during a revolution.

Those skilled in the art will appreciate that it is possible to determine the speed of travel of the belt. This non contact belt speed measurement has advantages over the normal techniques that use proximity sensors attached to tachymeter wheels or directly to the belt pulleys. Thus, the processor 60 also determines the speed of travel of the conveyor belt 12.

The processor 60 further determines the degree of overlap of splices of the conveyor belt 12.

The invention claimed is:

1. A system for monitoring a conveyor belt having magnetically permeable cords, which includes:
    an AC magnetic field generator for generating an alternating magnetic field to magnetize the cords, in use;
    a magnetic field sensing unit for sensing the alternating magnetic field provided, in use, by the magnetized cords and for providing signals representative of the alternating magnetic field provided, in use, by the magnetized cords, wherein the magnetic field sensing unit is a separate apparatus located downstream of the AC magnetic field generator for sensing the alternating magnetic field provided, in use, by the magnetized cords after being magnetized by the alternating magnetic field generated by the AC magnetic field generator;
    a DC magnetic field generator that erases an AC field generated by the AC magnetic field generator; and
    a processor for processing the signals to monitor continuous parts of the cords.

2. A system as claimed in claim 1, in which the AC magnetic field generator is positioned between the DC magnetic field generator and the magnetic field sensing unit.

3. A system as claimed in claim 1, in which the magnetic field sensing unit comprises an array of spaced magnetic field sensors.

4. A system as claimed in claim 3, in which the magnetic field sensors each have a sensing axis and the magnetic field sensing unit has magnetic field sensors suitably oriented to sense at least two components of the magnetic field provided, in use, by the magnetized cords.

5. A system as claimed in claim 1, in which the processor determines the presence of continuous parts of the cords of the belt.

6. A system as claimed in claim 5, in which the processor determines the vertical and transverse position of the cords of the belt in the belt matrix.

7. A system as claimed in claim 5, in which the processor generate images representing the continuous parts of cords of the belt and the system includes a display for displaying the images.

8. A system as claimed in claim 1, in which the processor determines the speed of travel of the belt.

9. A system as claimed in claim 1, in which the processor determines the position in space of a lateral edge of the belt.

10. A system as claimed in claim 9, in which the magnetic field sensing unit extends laterally beyond the belt on both sides thereof.

11. A system as claimed in claim 1, in which the processor determines the degree of overlap of a splice of the belt.

12. A system as claimed in claim 3, which includes data acquisition equipment for processing the signals supplied by the sensors and for supplying data to the processor.

13. A Conveyor belt arrangement, which includes
    a belt having a plurality of magnetically permeable cords; and
    a system for monitoring the belt as claimed in claim 1, the AC magnetic field generator and the magnetic field sensing unit thereof being positioned adjacent the belt and longitudinally spaced from one another.

14. A method of monitoring a conveyor belt having magnetically permeable cords, which includes:
    generating an AC magnetic field by an AC magnetic field generator to magnetize the cords in an alternating manner;
    sensing the magnetic fields provided by the magnetized cords by a magnetic field sensing unit and providing signals representative of their magnetic fields, wherein the sensing step occurs at the magnetic field sensing unit located downstream of the AC magnetic field generator in the generating step;

processing the signals to monitor continuous parts of the cords; and erasing the alternating magnetic fields provided by the magnetized cords by passing the cords over a DC magnetic field and generating new alternating magnetic fields by the AC magnetic field generator.

15. A method as claimed in claim 14, in which the alternating magnetic fields are sensed by an array of spaced magnetic field sensors.

16. A method as claimed in claim 15, in which at least two components of the magnetic fields are sensed by the array of spaced magnetic field sensors.

17. A method as claimed in claim 14, in which the signals are processed by a processor to determine the presence of continuous parts of the cords.

18. A method as claimed in claim 17, in which the processor determines the vertical and transverse position of the cords of the belt in the belt matrix.

19. A method as claimed in claim 17, in which the processor generates images representing the continuous parts of the cords of the belt and the method includes displaying the images.

20. A method as claimed in claim 14, in which the processor determines the speed of travel of the belt.

21. A method as claimed in claim 14, in which the signals are processed by a processor to determine the degree of overlap of a splice of the belt.

* * * * *